Inventors:
Vergil Mulholland
William T. Honiss,
by Robert A. Brown Atty.

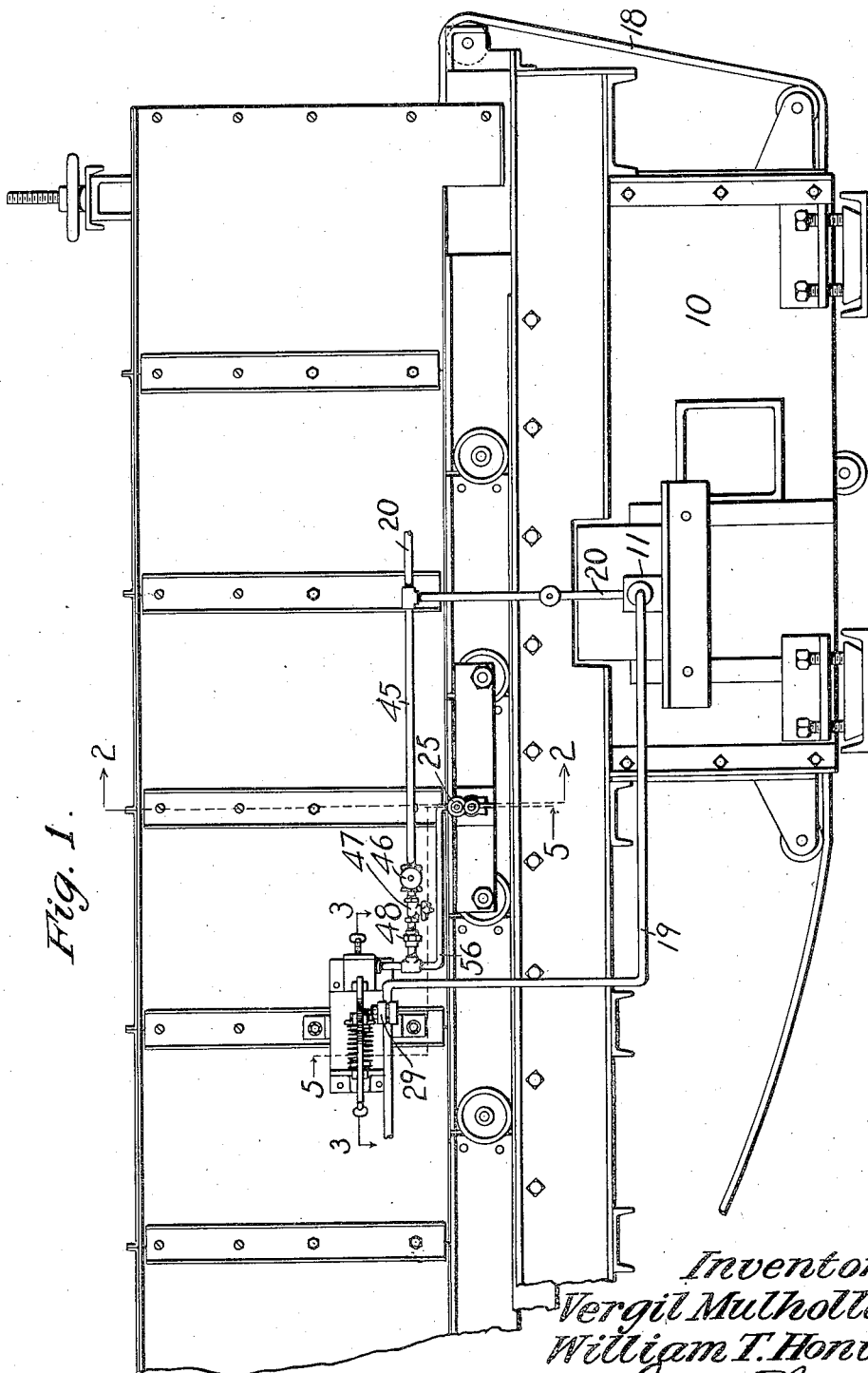

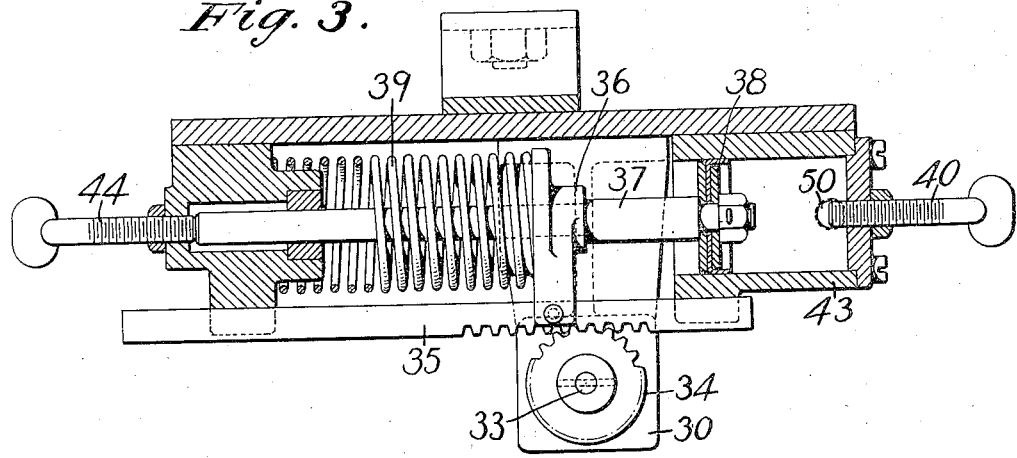
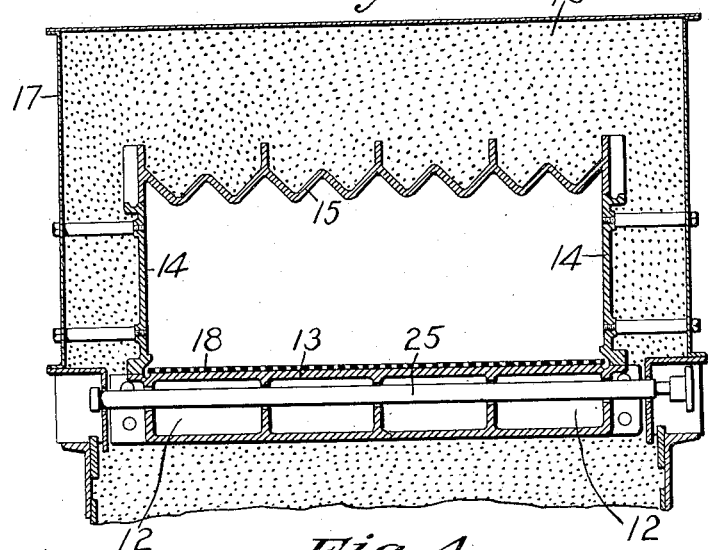
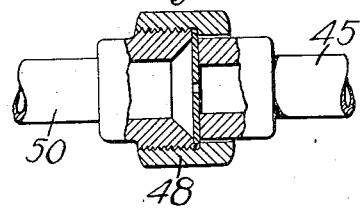

Patented July 5, 1932

1,866,366

UNITED STATES PATENT OFFICE

VERGIL MULHOLLAND AND WILLIAM T. HONISS, OF WEST HARTFORD, CONNECTICUT, ASSIGNORS TO HARTFORD-EMPIRE COMPANY, OF HARTFORD, CONNECTICUT, A CORPORATION OF DELAWARE

HEAT REGULATOR FOR LEERS

Application filed June 18, 1927. Serial No. 199,823.

This invention relates to leers for annealing glassware and, more particularly, to leers incorporating automatic means for controlling the heat treatment to which the ware is subjected.

When the glassware is first placed in the leer, it often varies in temperature throughout each piece, that is, the thinner parts and exterior portions will be at a lower temperature than the thicker, and interior portions. The first step in the treatment of the ware in the leer tunnel is to bring all parts of each article to a substantially uniform temperature. When the articles have a thick bottom, this necessitates lowering the temperature of the bottom and perhaps increasing the temperature of the upper part. The ware is then brought to a uniform temperature such that strains existing in the glass may be relieved, and thereafter the ware is cooled in a carefully regulated manner, so as to prevent setting up new strains of an injurious character.

The heat treatment taking place in the leer tunnel is determined principally by the heating means associated with the leer, but the amount of heat brought in with the incoming glassware must be also considered in the regulation of the heat condition in the leer.

One of the objects of the present invention is to provide a leer having automatic means for controlling the heat generating means associated with the leer in accordance with variations in a heat condition as affected by both heat generated by the leer heating means and from the incoming glassware.

To the accomplishment of this object, the present invention contemplates the provision of a leer having a fire box and a heat responsive element arranged to control automatically the heat generated in the fire box, this element being so positioned that it indicates a composite temperature determined in part by the heat coming from the fire box and in part by the heat of the ware being annealed, at the time that the temperature of individual pieces of ware are substantially uniform throughout.

Another object of the invention is to provide a leer having automatic means for regulating the heat generating mechanism, in which an abnormal operation of or accident to the controlling means will result in lowering the temperature of the leer, thus preventing abnormally high temperatures which might permanently damage the leer.

Other objects of the invention are to provide a leer of the character described, in which the temperature controlling mechanism is positive in operation, not likely to get out of order, and in which the parts in contact with gases of combustion will not be injuriously affected thereby.

The various features employed to the accomplishment of these objects, and such others as may be apparent from the following specification, are shown by way of illustration in the accompanying drawings, in which:

Figure 1 is a side elevation of the ware-receiving or hot end of the leer, having the present invention incorporated therein;

Fig. 2 is a transverse section through the leer, substantially on the line 2—2 of Fig. 1;

Fig. 3 is a horizontal section on an enlarged scale, through the fuel-controlling mechanism, substantially on the line 3—3 of Fig. 1;

Fig. 4 is an enlarged view, partly in section, of an air vent to be hereinafter described;

Figure 6:
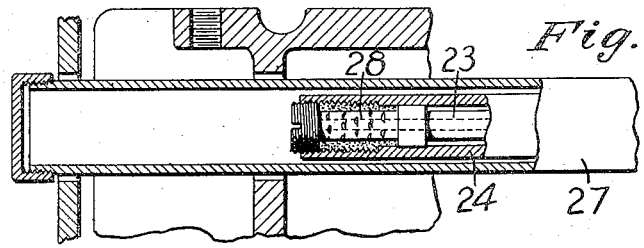
Fig. 6 is a detail view, showing the end of the heat responsive element opposite from that shown in Fig. 5.

A leer to which our invention is adapted and with which it is preferably used is substantially as shown in Patent No. 1,560,481, granted November 3, 1925, on the application of Vergil Mulholland.

Such a leer has a fire box heated by a gas or oil burner, from which heating gases are conducted under the floor of the leer tunnel by flues. At a point spaced from the receiving end of the leer, we employ a heat responsive element so positioned as to respond to the heat of the gases in the several flues and to the heat in the tunnel. The heat responsive element is arranged to open and close a valve which controls the operation of a motor piston, which in turn regulates the admission of fuel to the burner and so automatically regulates the generated heat in response to the heat condition at a selected point in the leer. This point is preferably that at which the ware is brought to a uniform temperature throughout.

Referring to the drawings:

The leer comprises a fire box 10 heated by a burner 11 arranged to deliver heat to a series of flues 12, the upper walls of which form the floor 13 of the leer tunnel. The side walls 14 and top 15 of the tunnel may be enclosed in suitable heat insulating material 16, surrounded by a suitable casing 17. The top 15 may be arranged to form flues in certain parts of the leer as is shown in the afore-mentioned patent. A conveyor 18 is provided to carry the ware through the tunnel.

The burner 11 may be adapted for use with any desired kind of fuel, but, as illustrated, is connected by a pipe 19 with a supply of oil. Compressed air is supplied to the burner by a pipe 20.

The supply of oil to the burner is regulated by a heat responsive element indicated generally by 25 (Figs. 1, 2 and 5) so composed and positioned as to respond to the heat in the flues 12 and to a lesser extent to the heat in the ware after it has been substantially equalized throughout each article. To this end, the heat responsive element 25 is located at some distance from the ware-receiving end of the tunnel, as is shown in Fig. 1, and past the hottest point of the leer and at that point passes transversely of the leer through the flues 12 and in close proximity to the floor of the leer.

The heat responsive element comprises a tubular member 24 having a relatively high coefficient of expansion, and a rod member 23 having a relatively low coefficient of expansion. The effective action of the element is effected by the difference in expansion between these members on variations in temperature. The member 24 preferably consists of a nickel tube, which has relatively high expansion under the influence of heat, and which is not injuriously affected by the products of combustion in the flues 12. The rod member 23 must also be capable of withstanding changes in temperature and the action of hot gases, and it has been found that the material best adapted for this purpose is one composed mainly of silica, preferably fused quartz. This material is of particular advantage in that the almost negligible expansion which it has is substantially uniform throughout the range of the heat variations and it is practically unaffected by the heat or gaseous products of combustion in the flues.

Figure 5:
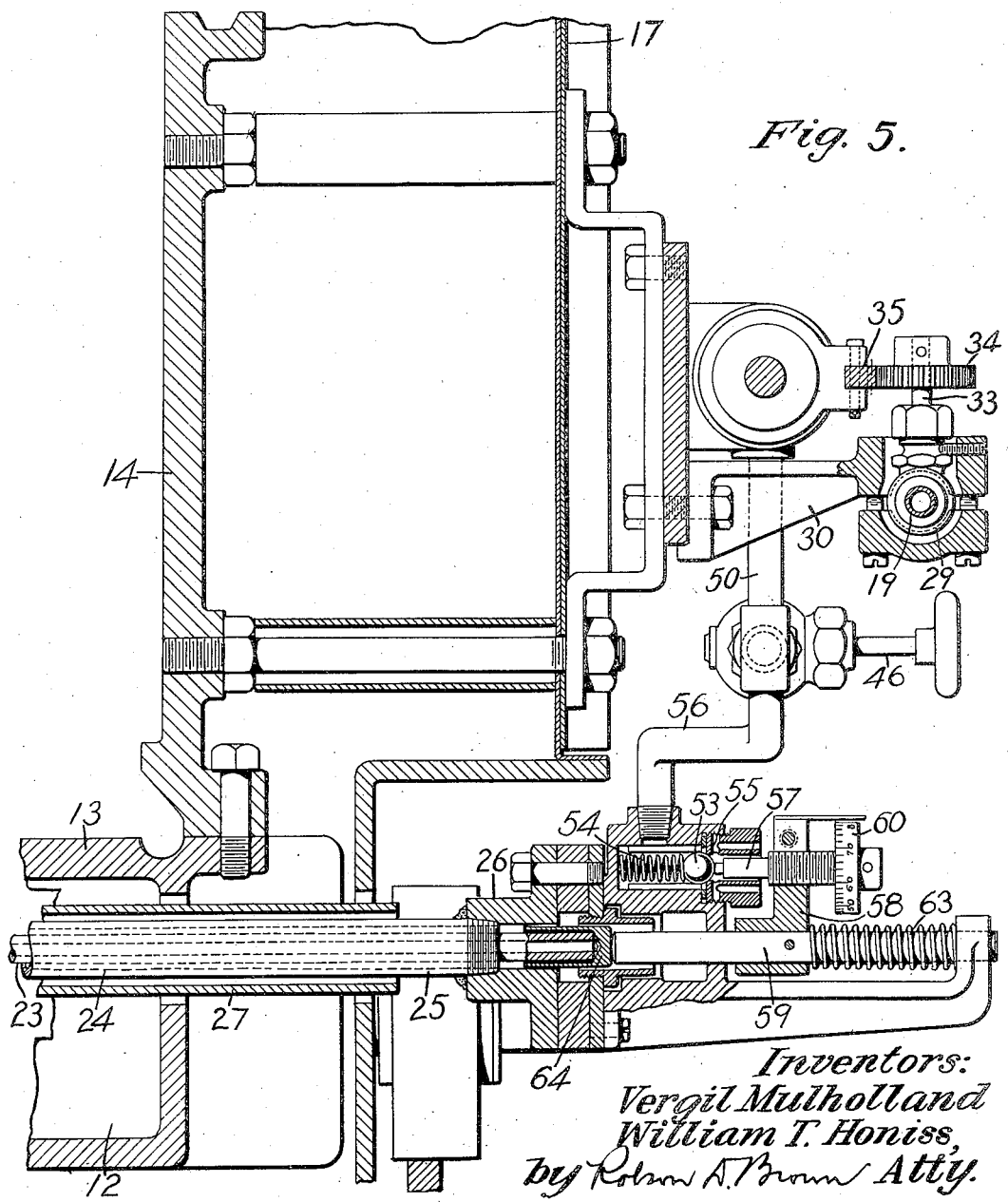
Fig. 5 is a vertical section on an enlarged scale through one side of the leer tunnel, substantially on the line 5—5 of Fig. 1.

The nickel tube 24 extends entirely across the leer, and is preferably enclosed in a protecting tube 27. It is fixed at one end in a bracket 26 and at the other end is rigidly connected at 28 (Fig. 6), with one end of the quartz rod 23 which extends through the center of the tube. The rod 23 projects within the bracket 26 as shown in Fig. 5. The movement of this projecting end of the quartz rod 23, which is to all practical purposes produced solely by the expansion of the nickel tube 24, the expansion of the rod itself being negligible, is employed to control the supply of fuel to the burner 11, through its control of a valve 53, which in turn governs the movements of a pneumatic device for increasing and decreasing the supply of fuel to the burner. Electrical or mechanical means actuated by the heat responsive member may be employed in lieu of the pneumatic device, if desired.

The control of the heat responsive member is made effective through the following mechanism. Fuel for the burner 11 is supplied from a source through the pipe 19 (Figs. 1 and 5), in which is interposed a throttle valve 29 supported on a bracket 30, which valve is adapted to be opened and closed automatically by the pneumatic device referred to upon actuation thereof by the heat responsive device. The throttle valve 29 is provided with a stem 33 carrying a gear 34 adapted to mesh with a rack 35. The rack is carried in a suitable guideway by a piston rod 37 of a piston 38 operating within a cylinder 43, piston rod 37 being connected to the rack 35 by the arm 36.

The details of the piston, rack and associated mechanism is best shown in Fig. 3. The piston is constantly urged in a direction which tends toward a closing movement of the valve 29 by the spring 39, and is moved in the opposite direction by air pressure in the cylinder 43. The air for the cylinder 43 is obtained from the same source as the air supplied to the burner 11. It passes from the source of supply through pipe 20, pipe 45, through a normally open hand-operated valve 46, strainer 47 and a reducing coupling 48 (Figs. 1 and 4) and pipe 50 to the cylinder 43. The pipe 50 is in constant communication with one end of the pipe 56, the opposite end of which is controlled by the valve 53, which valve is under the control of the heat responsive element, as will hereafter be explained in detail.

When the valve 53 is closed, the pipe 56 is closed and the pressure passing into the pipe 50 is built up in the cylinder 43, maintaining the piston 38 in its left-hand or valve-opening position against the pressure of the spring 39. When the valve 53 is open, the pressure in the cylinder 43 is bled to atmosphere through pipes 50, 56 and valve 53. This permits the movement of the piston under the urge of its spring 39 to the valve closing position. The extent to which valve 29 may be opened and closed during the operation of the piston and its rack is limited by the adjustable stop screws 44 and 40 respectively.

The opening and closing of the valve 53 is controlled by the heat responsive member through the following mechanism: The bracket 26 to which is fastened the fixed end of the tube 24 of the heat responsive element, is provided with an opening in which the rod 23 is moved on the expanding and contracting movements of the tube 24. This rod 23 carries a thimble or cap 64 fixed to its free end, which contacts with a sliding rod 59 which is held thereagainst by the spiral spring 63. The longitudinal movement of the rod 23, resulting from the expansion and contraction of the tube 24, imparts an endwise movement to the rod 59. The rod 59 carries a bracket 58, which in turn carries a plunger member 57 adapted to contact with and to open the valve 53, upon expansion of the tube 24 upon increase of heat in the leer. The valve 53 is of the ball type and is forced to its seat by a spring 54, when the spring is not compressed by the movement of the plunger member 57. The plunger member 57 is mounted on its bracket 58 by a screw connection, whereby it may be adjusted to open the valve 53 in response to a selected temperature in the leer. An indicator dial 60 is mounted on the plunger member and a finger is provided to visually indicate the temperature at which the valve 53 will be opened.

It will be noted that in the construction shown, we have made provision for all the necessary adjustments of the control apparatus and automatic means for reducing the temperature in the leer upon any failure of or accident to the heat-controlling element, or upon failure of the air supply to the burner and the cylinder 43. Any failure of the air supply is immediately followed by a valve closing movement of the piston 38 under the constant urge of the spring 39. Accident to the heat responsive device, as for instance the breakage of the rod 23, results in an opening of the valve 53, exhaustion of air from the cylinder 43, and a similar valve closing movement of the piston 38. Likewise, presence of dirt on the valve seat 55 bleeds the air from cylinder 43 and reduces the heat applied to the leer.

The operation of the device is as follows: The heat responsive element, located as shown, transversely of the leer tunnel and passing through each of the flues and in close proximity with the bottom of the tunnel, is responsive to changes in the temperature at that point resulting from changes in the heat conditions in the fire box, in the several flues and in the tunnel, and operates not only upon the increase and decrease of temperature in the flue gases occasioned by the increased fire in the fire-box, but to increases and decreases in the rate of loading the hot glass into the ware tunnel. When the temperature is reduced below the desired temperature for which the device is set, the metal tube 24 contracts and forces the rod 23 against the rod 59, compressing the spring 63 and permitting the valve 53 to seat under the pressure of the spring 54. This results in a building-up of pressure in the cylinder 43 and the movement of the piston and its rack against the pressure of the spring 39, opening the valve 29 and increasing the fuel supply to the burner 11, with consequent increase of heat in the leer. When the temperature rises above that desired, the tube 24 expands, carrying the rod 23 away from the rod 59, permitting that rod under the influence of its spring 63 to move the plunger 57 into contact with and open ball valve 53. The opening of this valve bleeds air pressure from the cylinder 43 and permits the spring 39 to move the piston 38 and the rack in the valve-closing direction, closing valve 29 and reducing the supply of fuel to the burner, and hence reducing the heat in the leer.

The efficiency of the heat responsive device used with our invention is largely dependent upon the selection of suitable material for the rod 23, and while a number of materials may be used for this purpose, we have found that none give the efficient operation and so well withstand the conditions existing in the flues of the leer as that described, i. e. one composed chiefly of fused silica. As stated, the expansion of this material is so small as to be negligible and is substantially uniform throughout a wide range of temperatures.

The automatic control of the fuel supply to the burner may be readily thrown in and out of operation by means of the valves and other mechanism provided.

In the drawings and description, we have shown but one embodiment of our invention, but it is obvious that various modifications of form and material may be substituted for those shown, without departing from the spirit of our invention; and the appended claims are not to be narrowly construed in view of the specific disclosure, but are to be given the greatest breadth the art will permit.

We claim:

1. A leer for annealing glassware, comprising an elongate tunnel, a reticulated conveyor belt for supporting articles of glassware and moving them through said tunnel, means for supporting said belt, heating means below said belt, an elongate temperature responsive element located immediately below said belt and extending transversely of said tunnel substantially from side to side thereof, said element being equally responsive to thermal conditions over substantially its entire length, and means for controlling said heating means in response to said element, whereby said heating means are controlled in response to the integrated effect of thermal conditions transversely of the leer.

2. A leer for annealing glassware, comprising a tunnel, means for moving glass therethrough, means for controlling the temperatures within said tunnel including a plurality of temperature controlling flues extending longitudinally below the tunnel and adjacent thereto, means for generating heated gases to be passed through said flues, means for conducting such gases to and through the flues, means to control the supply of fuel to the heat generating means, and a single elongate temperature responsive element equally responsive to thermal conditions over substantially its entire length and extending transversely through all of said flues for controlling the heat generating means in response to the integrated effect of the thermal conditions transversely of the leer in all of said flues.

Signed at Hartford, Connecticut, this 15th day of June, 1927.

VERGIL MULHOLLAND.
WILLIAM T. HONISS.